(12) United States Patent
Jang

(10) Patent No.: US 9,352,721 B2
(45) Date of Patent: May 31, 2016

(54) AIRBAG APPARATUS

(71) Applicant: HYUNDAI MOBIS CO., LTD., Seoul (KR)

(72) Inventor: Rae Ick Jang, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/592,734

(22) Filed: Jan. 8, 2015

(65) Prior Publication Data

US 2015/0283973 A1    Oct. 8, 2015

(30) Foreign Application Priority Data

Apr. 2, 2014    (KR) .................. 10-2014-0039612

(51) Int. Cl.
   *B60R 21/16*    (2006.01)
   *B60R 21/239*   (2006.01)
   *B60R 21/2338*  (2011.01)

(52) U.S. Cl.
   CPC ........... *B60R 21/239* (2013.01); *B60R 21/2338* (2013.01); *B60R 2021/2395* (2013.01); *B60R 2021/23384* (2013.01)

(58) Field of Classification Search
   USPC .......................................... 280/743.1, 743.2
   See application file for complete search history.

(56) References Cited

U.S. PATENT DOCUMENTS

| | | | | |
|---|---|---|---|---|
| 6,832,778 | B2 * | 12/2004 | Pinsenschaum et al. | 280/739 |
| 8,500,165 | B2 * | 8/2013 | Kwon | 280/743.2 |
| 2010/0032931 | A1 * | 2/2010 | Kumagai et al. | 280/742 |
| 2010/0133798 | A1 * | 6/2010 | Fukawatase et al. | 280/743.2 |
| 2011/0133437 | A1 * | 6/2011 | Jang et al. | 280/743.2 |
| 2011/0309605 | A1 * | 12/2011 | Kumagai | 280/741 |
| 2012/0306187 | A1 * | 12/2012 | Mendez et al. | 280/743.2 |
| 2013/0147171 | A1 * | 6/2013 | Shin et al. | 280/743.2 |
| 2014/0175778 | A1 * | 6/2014 | Choi et al. | 280/743.2 |
| 2014/0217712 | A1 * | 8/2014 | Nakamura et al. | 280/739 |

FOREIGN PATENT DOCUMENTS

KR    10-2013-0062521 A    6/2013

* cited by examiner

*Primary Examiner* — Toan To

(57) ABSTRACT

Disclosed is an airbag apparatus, which includes: an airbag body unfolded by gas generated by an inflator during a crash of a car; two or more vents formed at one side of the airbag body; shielding parts installed so as to shield the vents, respectively; a tether configured to connect the shielding parts to each other; and a hinge part configured to make the tether be in close contact with an internal surface of the airbag body. Accordingly, the vent is shielded after a passenger collides with the airbag body, so that it is possible to minimize an injury to the neck of the passenger by maintaining a pressure inside the airbag apparatus.

4 Claims, 4 Drawing Sheets

AIRBAG APPARATUS

CROSS-REFERENCE TO RELATED APPLICATIONS

This application claims priority to and the benefit of Korean Patent Application No. 10-2014-0039612 filed in the Korean Intellectual Property Office on Apr. 2, 2014, the entire contents of which are incorporated herein by reference.

TECHNICAL FIELD

The present invention relates to an airbag apparatus. More particularly, it relates to an airbag apparatus which controls a time for closing a vent hole by using a tether to maintain an internal pressure inside an airbag after a passenger collides with the airbag.

BACKGROUND ART

In general, an airbag apparatus for a vehicle is a safety apparatus for relieving impact by unfolding an airbag cushion when a crash accident occurs, and preventing a passenger from being catapulted out of a car. The airbag apparatus may be divided into a driver air bag (DAB) and a passenger air bag (PAB) for protecting passengers seating in the front seats during a front crash, a side airbag (SAB) for protecting a side of a passenger during a side crash, a curtain air bag (CAB), and the like.

A very important factor of the PAB among the airbag apparatuses is to reduce an injury to the neck of a passenger by maintaining an internal pressure after a crash of a passenger.

Particularly, in order to export a vehicle to North America, an airbag needs to pass through the new car assessment program (Latin NCAP), the largest weighted factor for a passenger NCAP marketability assessment is a neck injury test, subsequently, a neck injury reducing technique is a technical field that needs to be essentially improved.

A relevant technique includes Korean Patent Application Laid-Open No. 10-2013-0062521 entitled "Airbag Cushion for Reducing Injury including Vent Adjusting Means".

The airbag cushion for reducing an injury including a vent adjusting means adjusts a close time of a vent hole by using a horizontal tether.

However, since the horizontal tether is installed while traversing inside the airbag cushion in the airbag cushion for reducing an injury including a vent adjusting means, there may occur a case where the horizontal tether is not pressurized.

Accordingly, when the horizontal tether is not pressurized, the vent hole is not closed, so that it is impossible to reduce an injury to the neck.

SUMMARY OF THE INVENTION

The present invention has been made in an effort to provide an airbag apparatus, which reduces an impact amount of a passenger by using a vent when an airbag is unfolded and shields the vent after the passenger collides with the airbag, thereby maintaining a pressure inside the airbag.

However, an object of the present invention is not limited to the aforementioned matters, and those skilled in the art will clearly understand non-mentioned other objects through the following description.

An exemplary embodiment of the present invention provides an airbag apparatus, including: an airbag body unfolded by gas generated by an inflator during a crash of a car; two or more vents formed at one side of the airbag body; shielding parts installed so as to shield the vents, respectively; a tether configured to connect the shielding parts to each other; and a hinge part configured to make the tether be in close contact with an internal surface of the airbag body.

The shielding part may shield the vent in response to pressurization of the tether.

The shielding part may be a cover, of which one side is connected to the tether to shield the vent.

The shielding part may be a tube which is installed at an edge of the vent, and passes through the vent by pulling the tether to be inserted into the airbag body.

The shielding part may be a curtain, of which one side and the other side are sewn in a folded state, and one side connected with the tether is fractured by pulling the tether to close the vent.

A shielding time of the vent may be controlled by a length of the tether.

According to the airbag apparatus according to the exemplary embodiments of the present invention, it is possible to decrease an impact amount to a passenger by using a vent when an airbag body is unfolded, and shield the vent after the passenger collides with the airbag body, thereby maintaining a pressure inside an airbag and minimizing an injury to the neck of the passenger.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1A:
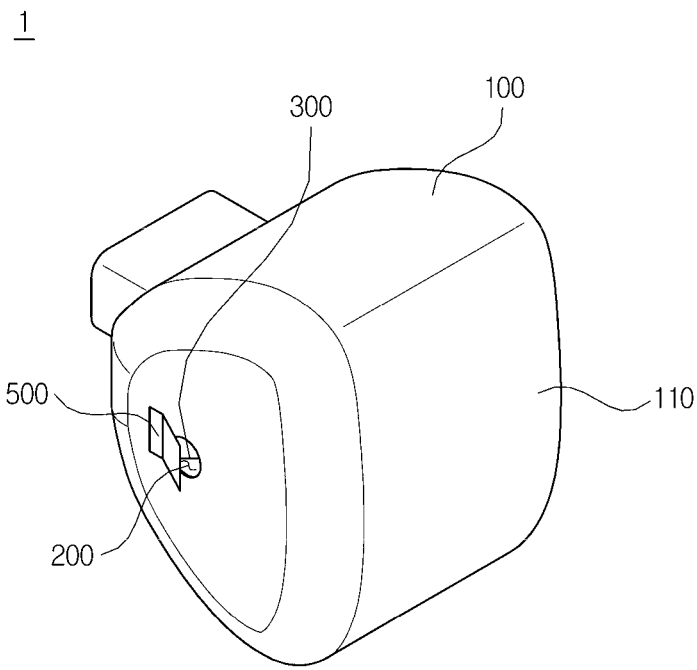
FIGS. 1A and 1B, and 2A and 2B are diagrams illustrating an airbag apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings in order to clarify a method of solving the technical problems of the present invention. However, in the description of the present invention, descriptions of publicly-known related technologies incorporated herein will be omitted when it is determined that the descriptions of the publicly-known related technologies may obscure the subject matter of the present invention. The terms used in the following description are defined considering the functions of the present invention and may vary depending on the intention or usual practice of a designer or manufacturer. Therefore, the definitions should be made based on the entire contents of the present specification. Parts indicated by like reference numerals (reference numbers) refer to like elements throughout the specification.

Hereinafter, airbag apparatuses 1, 1a, and 1b according to exemplary embodiments of the present invention will be described.

First Exemplary Embodiment

Referring to FIGS. 1A and 1B, and 2A and 2B, an airbag apparatus 1 according to an exemplary embodiment of the present invention includes an airbag body 100, two or more vents 200, a tether 300, a hinge part 400, and shielding parts. Here, the airbag body 100 includes a loading region 710 with which a passenger P collides, and the shielding parts are installed according to the number of vents 200 to shield the vents 200, respectively.

The airbag body 100 is unfolded by gas generated by an inflator (not illustrated) during a car crash to serve to relieve impact of the passenger P colliding with the airbag body 100.

Two or more vents 200 may be provided at one side of the airbag body 100.

As illustrated in FIG. 2, since the vent 200 is formed in an opened state when the gas flows into the airbag body 100, the vent 200 prevents an unfolding pressure of the airbag body 100 from being excessively increased by making the gas leak even while unfolding the airbag body 100.

The opened vent 200 makes the gas, which flows into the airbag body 100, leak even though the passenger P collides with the airbag body 100, so that the vent 200 increases a colliding time, for which the passenger P collides with the airbag body 100, thereby reducing impact force applied to the passenger P.

The tether 300 is closely installed inside the airbag body 100 so as to connect the shielding parts to each other. When the passenger P collides with the airbag body 100, an end of the tether 300 is supported by each shielding part, so that an impact amount applied to the passenger P is further decreased by the tether 300.

The hinge part 400 makes the tether 300 be in close contact with an internal side of the airbag body 100. Particularly, the hinge part 400 may be closely installed inside the airbag body 100 corresponding to the loading region 110.

That is, the airbag body 100 is unfolded by the gas generated by the inflator (not illustrated), so that the hinge part 400 restricts the tether 300 so that the tether 300 is in close contact with the internal side of the airbag body 100.

Accordingly, when the passenger P collides with the loading region 110, the passenger P pressurizes the loading region 110. The tether 300, which is closely installed in the loading region 110, is also pressurized by the passenger P.

The shielding part shields the vent 200 in response to the pressurization of the tether 300.

Here, the shielding part may be a cover 500 installed on an external surface of the airbag body 100.

The cover 500 is installed so as to cover the vent 200 at one side of the airbag body 100. That is, as illustrated in FIGS. 1A and 1B, and 2A and 2B, one side of the cover 500 is sewn with an external side of the airbag body 100, and the other side of the cover 500 is connected to the tether 300.

Accordingly, during the crash of the car, the gas flowing into the airbag body 100 is discharged through the vent 200. Since the vent 200 is in an opened state by discharge force of the gas, even though the passenger P collides with the airbag body 100, the gas is discharged through the vent 200, so that the impact amount applied to the passenger P is decreased.

Figure 1B:
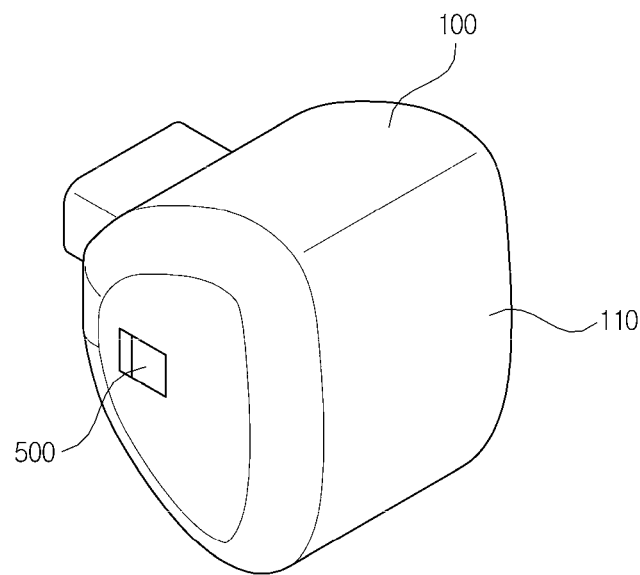
Figure 2A:
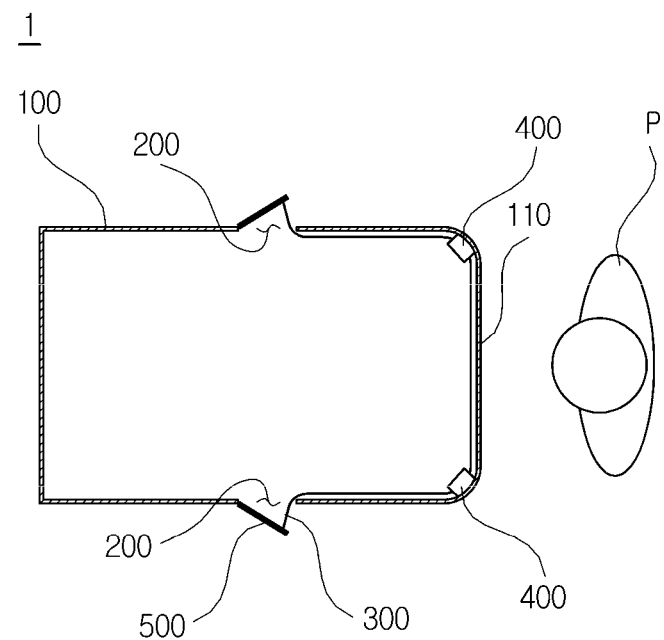
Figure 2B:
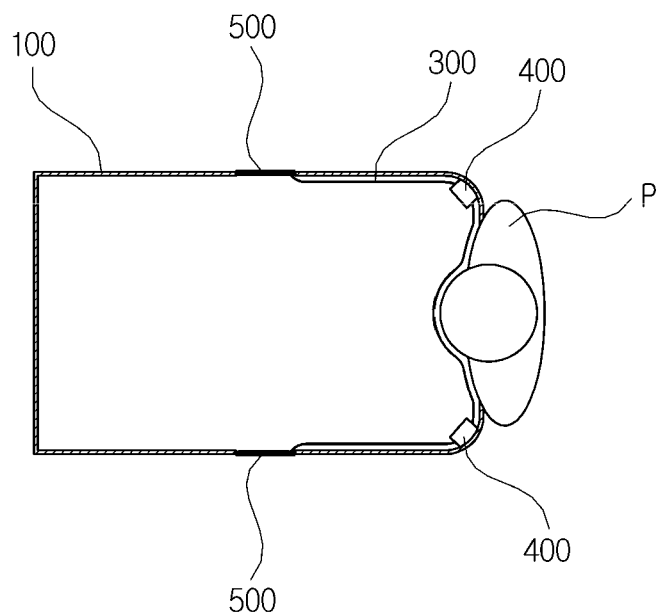

The cover 500 responds to the pressurization of the tether 300 to shield the vent 200 as illustrated in FIGS. 1B and 2B. Accordingly, an internal pressure of the airbag body 100 is maintained.

Accordingly, the airbag apparatus 1 is capable of minimizing severity of injury applied to the neck of the passenger P.

In the meantime, the tether 300 closes the vent 200 by pulling one side of the cover 500 while responding to the collision of the passenger P, so that a time, at which the cover 500 closes the vent 200, may be controlled according to a length of the tether 300.

Taken together, in the airbag apparatus 1, the vent 200 is in an opened state when the airbag body 100 is unfolded, so that even though the passenger P collides with the airbag body 100, an impact amount is decreased by the airbag body 100 into which the gas flows.

After the passenger P collides with the airbag body 100, the vent 200 is shielded by the shielding part which responds to the pressurization of the tether 300, so that the gas discharged through the vent 200 is shielded and an internal pressure of the airbag body 100 is maintained.

Accordingly, the airbag apparatus 1 is capable of minimizing severity of injury applied to the neck of the passenger.

Second Exemplary Embodiment

Figure 3A:
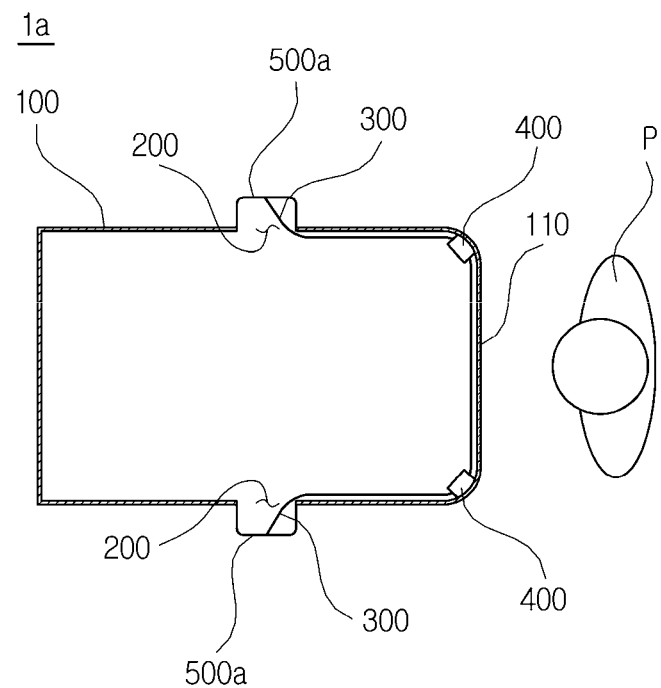
FIGS. 3A and 3B are diagrams illustrating an airbag apparatus according to a second exemplary embodiment of the present invention.
Figure 3B:
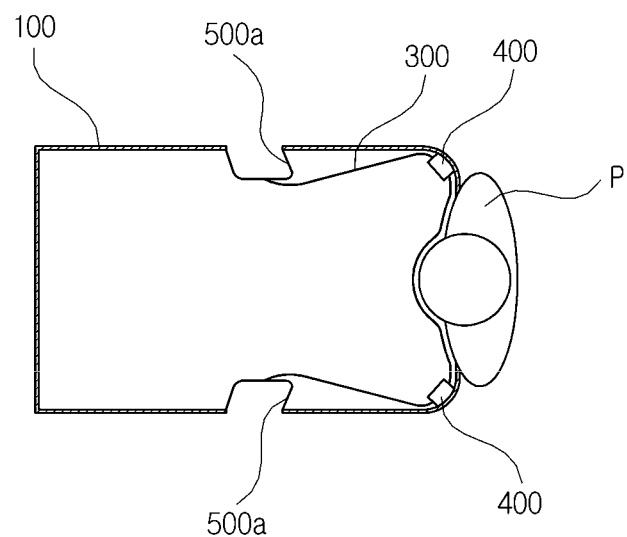

FIGS. 3A and 3B are diagrams illustrating an airbag apparatus 1a according to another exemplary embodiment of the present invention.

Hereinafter, in describing the airbag apparatus 1a according to a second exemplary embodiment of the present invention, descriptions of the same constituent elements as those of the airbag apparatus 1 according to the first exemplary embodiment of the present invention will be omitted.

The airbag apparatus 1a may include an airbag body 100, two or more vents 200, a tether 300, a hinge part 400, and shielding parts.

The shielding part shields the vent 200 in response to pressurization of the tether 300. Here, the shielding part may be a tube 500a installed on an external surface of the airbag body 100.

The tube 500a is installed so as to shield the vent 200 at one side of the airbag body 100 as illustrated in FIGS. 3A and 3B.

The tube 500a has a pocket shape including an opening at one side thereof, and the opening of the tube 500a is installed at an external side of the airbag body 100 so as to communicate with the vent 200. For example, a corner at the opening side of the tube 500a may be installed at an edge of the vent 200.

Accordingly, the gas flowing into the airbag body 100 flows into the tube 500a through the vent 200, and thus the tube 500a is expanded.

That is, the gas moves to the tube 500a through the vent 200, so that the vent 200 installed in the airbag apparatus 1a performs the same function as that of the vent 200 of the airbag apparatus 1 installed to be opened.

In the meantime, the tube 500a responds to pressurization of the tether 300 to be pulled into the airbag body 100. Accordingly, the tube 500a passes through the vent 200 and is inserted into the airbag body 100 to close the vent 200. Here, a time, at which the tube 500a closes the vent 200, may be controlled according to a length of the tether 300.

The expanded tube 500a is inserted into the airbag body 100, a pressure inside the airbag body 100 is more rapidly stabilized and maintained.

Third Exemplary Embodiment

Figure 4A:
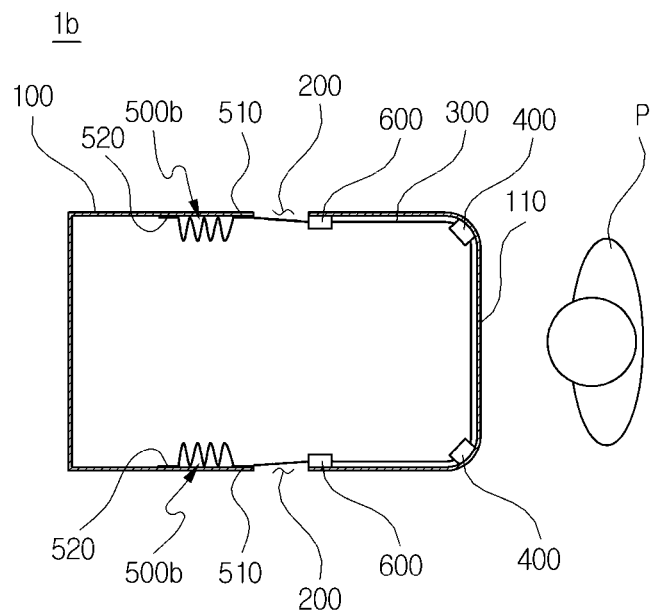
FIGS. 4A and 4B are diagrams illustrating an airbag apparatus according to a third exemplary embodiment of the present invention.
Figure 4B:
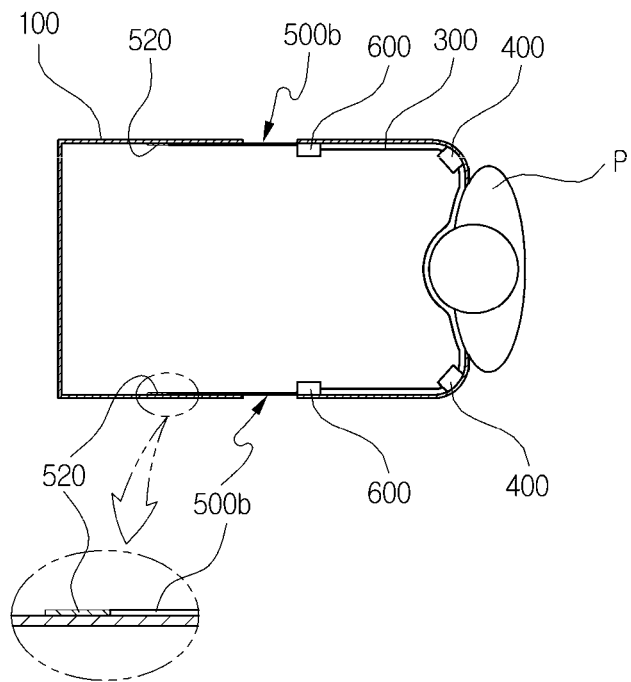

FIGS. 4A and 4B are diagrams illustrating an airbag apparatus lb according to another exemplary embodiment of the present invention.

Hereinafter, in describing the airbag apparatus lb according to a third exemplary embodiment of the present invention, descriptions of the same constituent elements as those of the airbag apparatus 1 according to the first exemplary embodiment of the present invention will be omitted.

The airbag apparatus lb may include an airbag body 100, two or more vents 200, a tether 300, a hinge part 400, and shielding parts.

The shielding part shields the vent 200 in response to pressurization of the tether 300.

Here, the shielding part may be a curtain 500b, of which one side and the other side are sewn in a folded state, on an internal surface of the airbag body 100. The curtain 500b may be formed in a sheet shape.

In order to clarify the present invention, the sewn one side and other side of the curtain 500b may be divided into an attachment part 510 and a sewing supporting part 520, respectively.

The tether 300 is connected to the attachment part 510, and the attachment part 510 is fractured by pressure applied to the tether 300. Accordingly, one side of the curtain 500b, which is in a folded state, moves in a longitudinal direction of the tether 300 to close the vent 200 as illustrated in FIGS. 4A and 4B.

The sewing supporting part 520 makes the curtain 500b be fixed to the airbag body 100 even though the attachment part 510 is fractured.

Here, a time, at which the attachment part 510 of the curtain 500b is fractured, may be controlled according to a length of the tether 300.

In the meantime, the airbag apparatus 1b may further include a tether guide hinge part 600.

The tether guide hinge part 600 guides the tether 300 so that one side of the curtain 500b may close the vent 200 according to the fracture of the attachment part 510.

Various exemplary embodiments of the present invention may solve other technical objects other than the contents mentioned in the present specification in the technical field and a relevant technical field.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An airbag apparatus, comprising:
   an airbag body expanding by gas generated by an inflator during a crash of a vehicle;
   two or more vents formed at portions of the airbag body;
   two or more curtains installed such that each of the curtains opens or blocks a corresponding one of the vents;
   a tether configured to connect adjacent curtains to each other; and
   a hinge part configured to make the tether proximate to an internal surface of the airbag body,
   wherein first and second side portions of each of the curtains are sewn in a folded state, and the first side portion connected with the tether is broken by pulling the tether to close the corresponding one of the vents.

2. The airbag apparatus of claim 1, wherein the curtains close the vents in response to a force applied to the tether.

3. The airbag apparatus of claim 1, wherein a closing time of the vents corresponds to a length of the tether.

4. The airbag apparatus of claim 1, wherein each of the curtains closes the corresponding one of the vents when a passenger collides with the airbag body.

\* \* \* \* \*